US012682873B2

(12) United States Patent (10) Patent No.: US 12,682,873 B2
Ishii et al. (45) Date of Patent: Jul. 14, 2026

(54) DISPLACEMENT SENSOR AND ELECTRONIC MUSICAL INSTRUMENT

(71) Applicant: YAMAHA CORPORATION, Hamamatsu (JP)

(72) Inventors: Jun Ishii, Hamamatsu (JP); Michiko Tanoue, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 965 days.

(21) Appl. No.: 17/951,255

(22) Filed: Sep. 23, 2022

(65) Prior Publication Data

US 2023/0013774 A1 Jan. 19, 2023

Related U.S. Application Data

(63) Continuation of application No. PCT/JP2021/011266, filed on Mar. 18, 2021.

(30) Foreign Application Priority Data

Mar. 26, 2020 (JP) ................................. 2020-056224

(51) Int. Cl.
*G10H 1/34* (2006.01)
*G01D 5/20* (2006.01)
*G10H 1/00* (2006.01)

(52) U.S. Cl.
CPC ............. *G10H 1/344* (2013.01); *G01D 5/204* (2013.01); *G10H 1/0008* (2013.01); *G10H 2220/221* (2013.01); *G10H 2220/275* (2013.01)

(58) Field of Classification Search
CPC ................. G10H 1/344; G10H 1/0008; G10H 2220/221; G10H 2220/275; G01D 5/204
(Continued)

(56) References Cited

U.S. PATENT DOCUMENTS 4,580,478 A * 4/1986 Brosh .................. G10H 1/0555
984/319
8,941,389 B2 * 1/2015 Hrubes .................... G01D 1/00
324/654

(Continued)

FOREIGN PATENT DOCUMENTS

JP H0348295 A * 3/1991
WO WO-2019122867 A1 * 6/2019 .......... H03K 17/972
WO WO-2020030911 A1 * 2/2020 ............. G10H 3/146

OTHER PUBLICATIONS

Extended European Search Report issued in European Appln. No. 21777076.7, mailed Mar. 11, 2024.
(Continued)

*Primary Examiner* — Christina M Schreiber
(74) *Attorney, Agent, or Firm* — ROSSI, KIMMS & McDOWELL LLP

(57) ABSTRACT

A displacement sensor includes: a detectable portion: including a first coil; and being disposed on a movable member that is displaceable in response to an operation; and a signal generator: including a second coil that opposes the first coil; and being configured to generate a detection signal based on a relative position between the first coil and the second coil. A first distance from a first end of the first coil to a second end of the first coil in a first direction differs from a second distance from a third end of the first coil to a fourth end of the first coil in a second direction perpendicular to the first direction when the first coil is viewed in plan view.

2 Claims, 9 Drawing Sheets

(58) Field of Classification Search
USPC ............................................................ 84/602
See application file for complete search history.

(56)                    References Cited

U.S. PATENT DOCUMENTS

| | | | | |
|---|---|---|---|---|
| 2002/0184989 | A1* | 12/2002 | Meisel ................. | G10H 1/0555 84/216 |
| 2017/0016965 | A1* | 1/2017 | Chaware ................. | G01R 33/07 |
| 2020/0320966 | A1* | 10/2020 | Clark ................... | G10H 1/0555 |
| 2021/0033424 | A1* | 2/2021 | Cadugan .............. | G01R 33/091 |
| 2021/0151020 | A1* | 5/2021 | Tanoue ................ | G10H 1/0555 |
| 2021/0294431 | A1* | 9/2021 | Clark ................... | G06F 3/0202 |
| 2022/0057236 | A1* | 2/2022 | Ishii ..................... | G01D 5/2026 |
| 2022/0246122 | A1* | 8/2022 | Clark ................... | G10H 1/0555 |
| 2022/0270579 | A1* | 8/2022 | Nishida ................. | G06F 3/0338 |
| 2022/0270580 | A1* | 8/2022 | Ishii ....................... | G10H 1/344 |
| 2022/0270581 | A1* | 8/2022 | Kanehara ............. | G01D 5/2026 |
| 2022/0277717 | A1* | 9/2022 | Miyoshi ................. | G01D 5/204 |
| 2022/0277719 | A1* | 9/2022 | Ishii ....................... | G10H 1/344 |
| 2022/0397380 | A1* | 12/2022 | Yoshida ................. | G01B 7/023 |
| 2023/0013774 | A1* | 1/2023 | Ishii ..................... | G01D 5/2026 |
| 2023/0386442 | A1* | 11/2023 | Miyoshi ............... | G10H 1/0008 |
| 2024/0071344 | A1* | 2/2024 | Ishii ........................ | G10H 1/348 |
| 2024/0078988 | A1* | 3/2024 | Ishii ..................... | G10H 1/0555 |
| 2025/0003771 | A1* | 1/2025 | Komatsu ............... | G10H 1/344 |
| 2025/0078794 | A1* | 3/2025 | Igarashi ................. | G10H 1/185 |

OTHER PUBLICATIONS

English translation of Written Opinion issued in Intl. Appln. No. PCT/JP2021/011266 mailed on Jun. 8, 2021, previously cited in IDS filed Sep. 23, 2022.
Office Action issued in Chinese Appln No. 202180021497.3 mailed Jun. 25, 2024. English machine translation provided.
Office Action issued in Japanese Appln. No. 2022-510061 mailed on Apr. 18, 2023. English machine translation provided.
International Search Report issued in Intl. Appln. No. PCT/JP2021/011266 mailed Jun. 8, 2021. English translation provided.
Written Opinion issued in Intl. Appln. No. PCT/JP2021/011266 mailed Jun. 8, 2021.

* cited by examiner

························ L1=L2×160%
– – – – L1=L2×140%
———— L1=L2×120%
–·–··–·· L1=L2×100%

DISPLACEMENT SENSOR AND ELECTRONIC MUSICAL INSTRUMENT

CROSS REFERENCE TO RELATED APPLICATIONS

This application is a Continuation Application of PCT Application No. PCT/JP2021/011266, filed Mar. 18, 2021, and is based on and claims priority from Japanese Patent Application No. 2020-056224, filed Mar. 26, 2020, the entire contents of each of which are incorporated herein by reference.

BACKGROUND

Field of the Invention

The present disclosure relates to displacement sensors and to electronic musical instruments.

Description of Related Art

A variety of techniques have been proposed for detecting displacement of a movable member such as a key of a musical keyboard instrument. Patent document 1 (e.g., Japanese Patent Application Laid-Open Publication No. H 3-48295) discloses a configuration for detecting a position of each key using coils disposed on the frame of a musical keyboard instrument and metal plates disposed on the keys. In this configuration, pressing a key changes current flowing in the corresponding coil in response to the displacement of the metal plate of the key. The current flowing in the coil is detected to generate a detection signal based on the displacement of the pressed key.

However, it is difficult to generate a detection signal with high accuracy based on the displacement of the movable member in the technique of Patent Document 1.

SUMMARY

In view of the circumstances described above, an object of one aspect of the present disclosure is to generate a detection signal highly refractive of the displacement of the movable member.

To achieve the above-stated object, a displacement sensor according to one aspect of the present disclosure includes: a detectable portion: including a first coil; and being disposed on a movable member that is displaceable in response to an operation; and a signal generator: including a second coil that opposes the first coil; and being configured to generate a detection signal based on a relative position between the first coil and the second coil, in which a first distance from a first end of the first coil to a second end of the first coil in a first direction differs from a second distance from a third end of the first coil to a fourth end of the first coil in a second direction perpendicular to the first direction when the first coil is viewed in plan view.

A displacement sensor according to another aspect of the present disclosure includes: a detectable portion: including a first coil; and being disposed on a movable member that is displaceable in response to an operation; and a signal generator: including a second coil that opposes the first coil; and being configured to generate a detection signal based on a relative position between the first coil and the second coil, in which: the first coil includes a first part and a second part that generate opposite magnetic fields from each other in response to a current being received by the first coil, the second coil includes a third part and a fourth part that generate opposite magnetic fields from each other in response to a current being received by the second coil, and a first distance between a center of the first part and a center of the second part is greater than a second distance between a center of the third part and a center of the fourth part.

DESCRIPTION OF THE EMBODIMENTS

A: Embodiment

Figure 1:
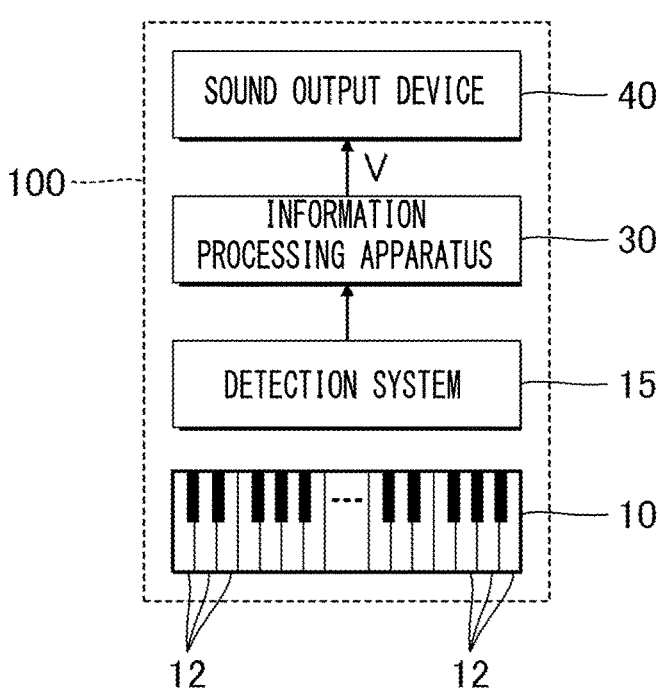
FIG. 1 is a block diagram showing an example configuration of a musical keyboard instrument to which displacement sensors according to one aspect is applied.

FIG. 1 is a block diagram showing an example configuration of a musical keyboard instrument 100 in which displacement sensors according to one aspect of the present disclosure are used. The musical keyboard instrument 100 is an electronic musical instrument that includes a keyboard 10, a detection system 15, an information processing apparatus 30 and a sound output device 40. The keyboard 10 comprises keys 12 including black and white keys. The keys 12 are each movable members that are displaced by a playing operation of a user. The detection system 15 detects the displacement (position) of each of the key 12. The information processing apparatus 30 generates an audio signal V in accordance with a detection result made by the detection system 15. The audio signal V is a signal representative of a musical sound with a pitch that corresponds to one of the keys 12 operated by the user. The sound output device 40 outputs sound represented by the audio signal V. The sound output device 40 is a speaker or a headphone, for example.

Figure 2:
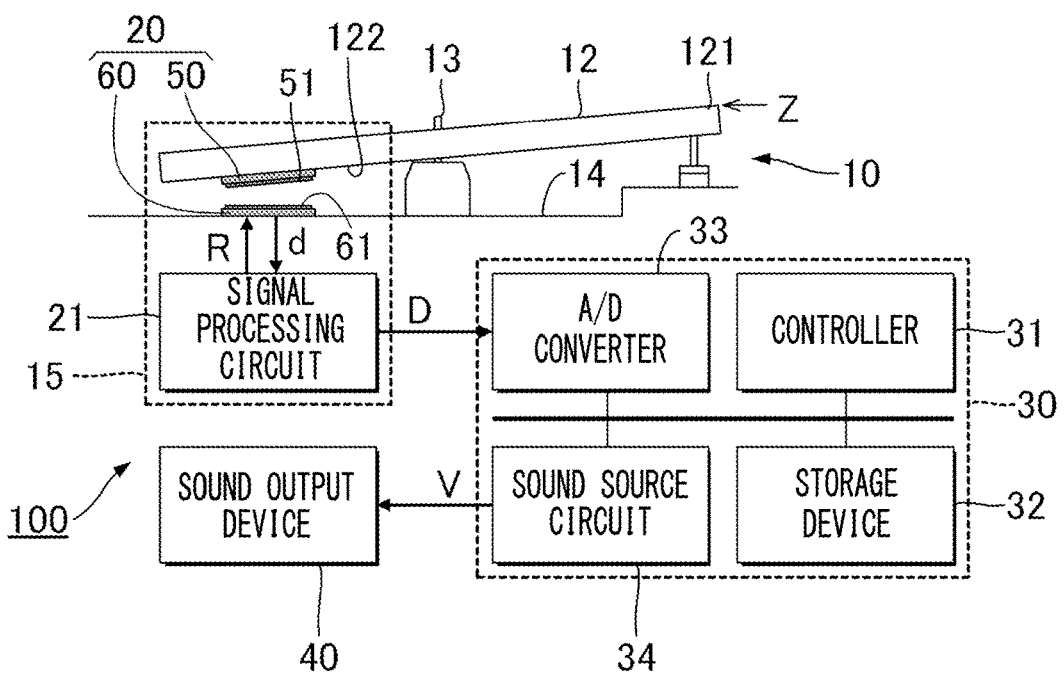
FIG. 2 is a block diagram showing an example of a configuration of the musical keyboard instrument.

FIG. 2 is a block diagram showing a specific configuration of the musical keyboard instrument 100, focusing on one of the keys 12 of the keyboard 10. Each of the keys 12 of the keyboard 10 is supported by a supporting member 14 using the fulcrum 13 as a pivot point. The supporting member 14 is a structure that supports each element of the musical keyboard instrument 100. The end 121 of each key 12 is displaced vertically by pressing and releasing keys by a user. The detection system 15 generates a detection signal D at a level depending on a vertical position Z of the end 121 for each of the keys 12. The position Z is expressed by an amount of displacement of the end 121, relative to a rest position of the end 121 in a released state in which no load is applied to the key 12.

The detection system 15 includes displacement sensors 20 that are provided for each of the keys 12 and a signal processing circuit 21 that is common in these keys 12. Each of the displacement sensors 20 is a position sensor that detects a position of each key 12 and includes a detectable portion 50 and a signal generator 60. The signal generator 60 is disposed in the supporting member 14. The detectable portion 50 is disposed in the corresponding key 12. Specifically, the detectable portion 50 is disposed on the bottom surface 122 (hereinafter, "provision surface") of the key 12. The detectable portion 50 includes a first coil 51. The signal generator 60 includes a second coil 61. The first coil 51 and the second coil 61 oppose each other and are vertically spaced apart from each other. A distance between the signal generator 60 and the detectable portion 50 (a distance between the first coil 51 and the second coil 61) changes depending on the position Z of the end 121 of the key 12, the position Z changes by depression or release of the key 12. The signal processing circuit 21 generates a detection signal D with a level depending on the distance between the first coil 51 and the second coil 61.

The information processing apparatus 30 analyzes the detection signal D supplied from the signal processing circuit 21, to determine the position Z of each key 12. The information processing apparatus 30 is realized by a computer system that includes a controller 31, a storage device 32, an A/D converter 33, and a sound source circuit 34.

The A/D converter 33 converts the detection signal D supplied from the signal processing circuit 21 from an analog signal to a digital signal. The controller 31 comprises one or more processors for controlling each of elements of the musical keyboard instrument 100. For example, the controller 31 is constituted of one or more, among different types, of such as a Central Processing Unit (CPU), a Sound Processing Unit (SPU), a Digital Signal Processor (DSP), a Field Programmable Gate Array (FPGA), and an Application Specific Integrated Circuit (ASIC).

The controller 31 analyzes the detection signal D, which is converted by the A/D converter 33, to analyze a position Z of each key 12. The controller 31 instructs the sound source circuit 34 to produce a musical sound based on the position Z of each key 12. The sound source circuit 34 generates an audio signal V representative of the musical sound as instructed by the controller 31. That is, the sound source circuit 34 detects that the corresponding key has reached a predetermined position based on the voltage level δ of the detection signal D and starts generating the audio signal V. The volume of the audio signal V is controlled based on the change of the speed of the voltage level δ. The audio signal V is supplied from the sound source circuit 34 to the sound output device 40, whereby a musical sound that corresponds to playing operations performed by a user (depression or release of each key 12) is output from the sound output device 40. Specifically, depression of a key 12 by the user outputs a musical sound, and release of the key 12 stops the musical sound.

The storage device 32 comprises one or more memories that store programs executed by the controller 31 and data used by the controller 31. The storage device 32 is constituted of, for example, a known recording medium, such as a magnetic recording medium or a semiconductor recording medium. The storage device 32 may comprise a combination of different types of recording media. The storage device 32 may be a portable recording medium detachable from the musical keyboard instrument 100, or may be an external recording medium (e.g., online storage), with which the musical keyboard instrument 100 can communicate. Execution of the program stored in the storage device 32 allows for the controller 31 to realize the functions of the sound source circuit 34. The sound source circuit 34 or the controller 31 which acts as the sound source circuit 34 is a sound controller that generates an audio signal V depending on the voltage level δ of the detection signal D.

Figure 3:
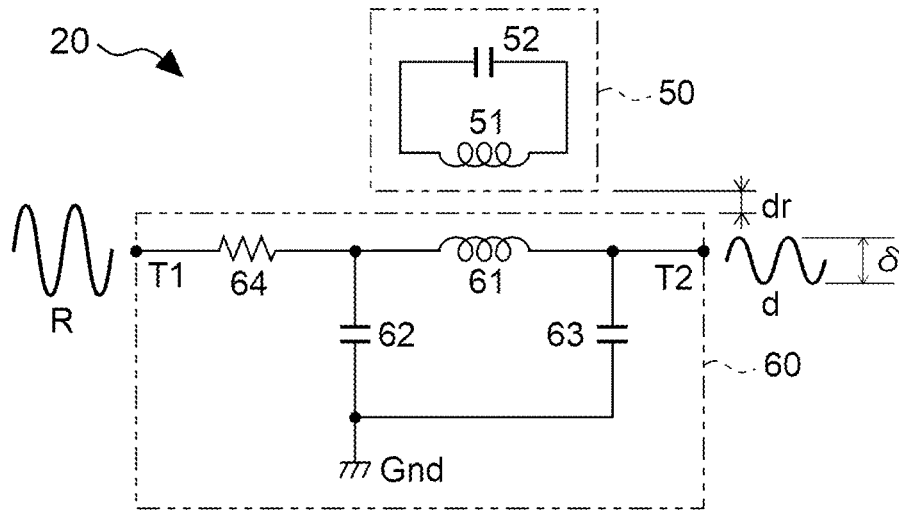
FIG. 3 is a circuit diagram of a main part of a displacement sensor.

FIG. 3 is an electronic circuit diagram of a displacement sensor 20 included in a detectable portion 50 and a signal generator 60. The signal generator 60 includes an input T1, an output T2, a second coil 61, a capacitor 62, a capacitor 63 and a resistor 64. The signal generator 60 has a resonant circuit, which is comprised of the second coil 61, the capacitor 62, the capacitor 63, and the resistor 64. The input T1 is wired to a first end of the resistor 64. A second end of the resistor 64 is wired to both a first end of the capacitor 62 and a first end of the second coil 61. A second end of the second coil 61 is wired to both the output T2 and a first end of the capacitor 63. A second end of the capacitor 62 and a second end of the capacitor 63 are grounded to a potential Gnd as the zero voltage reference.

The detectable portion 50 includes a first coil 51 and a capacitor 52. A first end of the first coil 51 and a first end of the capacitor 52 are wired to each other. A second end of the first coil 51 and a second end of the capacitor 52 are wired to each other. The first coil 51 and the capacitor 52 comprise a resonant circuit. The resonant frequency of the signal generator 60 is set based on the relationship between this resonant frequency and that of the detectable portion 50. The resonant frequency of the signal generator 60 is set to a frequency approximately equal to the resonant frequency of the detectable portion 50, or to a frequency obtained by multiplying the resonant frequency of the detectable portion 50 by a predetermined constant.

The input T1 of the signal generator 60 receives a reference signal R. The reference signal R is a voltage signal, a level of which changes periodically. The reference signal R may be a cyclic signal of a freely selected waveform, such as a sine wave. The frequency of the reference signal R is set based on the relationship between this frequency and the resonant frequency of the detectable portion 50. For example, the frequency of the reference signal R is approximately equal to the resonance frequencies of the signal generator 60 and the detectable portion 50.

A current in accordance with the reference signal R is supplied to the second coil 61, which generates a magnetic field in the second coil 61. The electromagnetic induction generated by the magnetic field in the second coil 61 causes an induced current in the first coil 51. As a result, a magnetic field, which has a direction such that change in the magnetic field in the second coil 61 is cancelled, is generated in the first coil 51. Since the magnetic field in the first coil 51 changes depending on a distance dr between the first coil 51 and the second coil 61, a detection signal d with a voltage level (peak-to-peak value) δ depending on the distance dr therebetween is output from the output T2 of the signal generator 60. The detection signal d is a cyclical signal the level of which fluctuates with the same cycle as that of the reference signal R.

Figure 4:
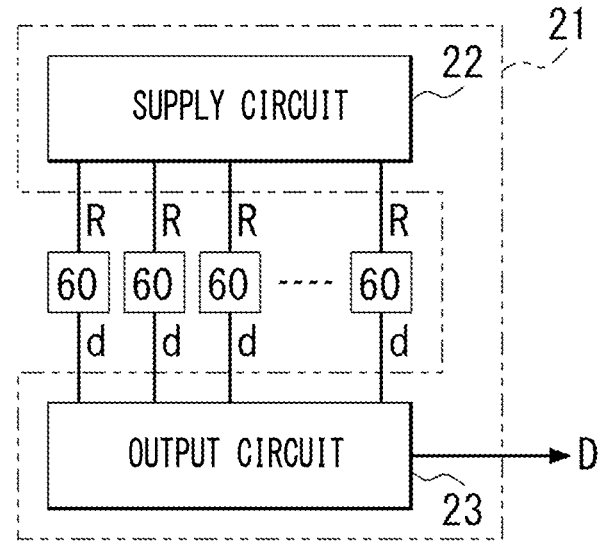
FIG. 4 is a block diagram showing an example of a signal processing circuit.

FIG. 4 is a specific block diagram of the signal processing circuit 21. The signal processing circuit 21 includes a supply circuit 22 and an output circuit 23. The supply circuit 22 supplies the input T1 of each of the signal generators 60 with a reference signal R. The supply circuit 22 supplies each of the signal generators 60 with a reference signal R by time division. Specifically, the supply circuit 22 is a demultiplexer, which selects each of the signal generators 60 one by one, and supplies the reference signal R to the selected signal generator 60. Thus, the reference signal R is supplied to each of the signal generators 60 by time division. It is to be noted that the cycle of the reference signal R is sufficiently shorter than a period during which the supply circuit 22 selects one signal generator 60.

The output circuit 23 generates a detection signal D by sequentially arranging on a time axis detection signals d that are sequentially output from the signal generators 60. The detection signal D is a time divisional signal with voltage levels 6, each of which is dependent on a distance dr between the first coil 51 and the second coil 61 of the corresponding key 12. As described previously, the distance dr between the first coil 51 and the second coil 61 correlates to the position Z of each key 12. Accordingly, the detection signal D is a signal depending on different positions Z of the respective keys 12. When attention is focused on one key 12, the detection signal d depends on the relative position between the first coil 51 and the second coil 61 opposites the first coil 51. The detection signal D generated by the output circuit 23 is supplied to the information processing apparatus 30.

Figure 5:
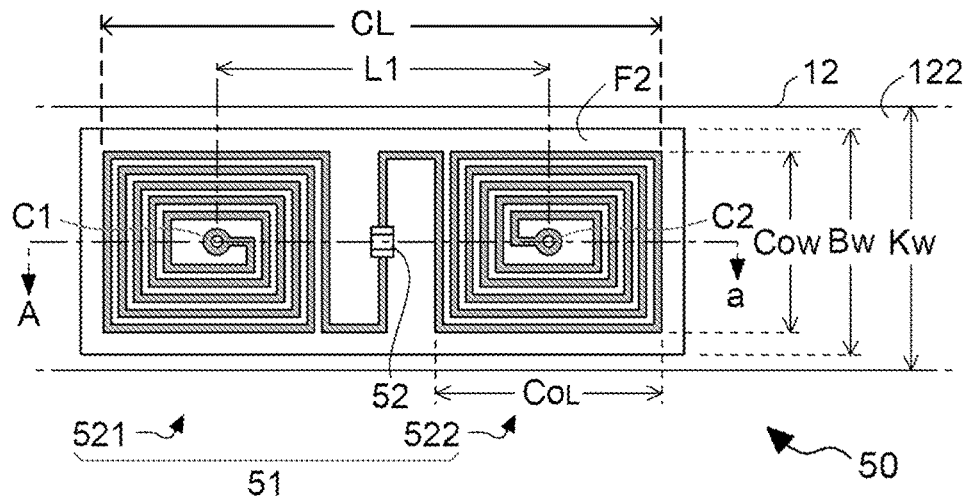
FIG. 5 is a plan view of a specific configuration of a detectable portion.
Figure 6:
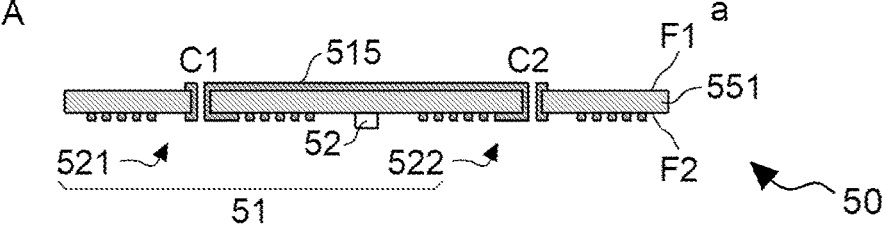
FIG. 6 is a cross-sectional view taken along line A-a line shown in FIG. 5.

The configuration of a detectable portion 50 and a signal generator 60 will be described. FIG. 5 is a plan view of the specific configuration of a detectable portion 50, which is viewed from the corresponding signal generator 60. FIG. 6 is a cross-sectional view taken along line A-a shown in FIG. 5.

The detectable portion 50 includes a substrate 551 and a wiring pattern provided on both surfaces F1 and F2 of the substrate 551. The substrate 551 is a rectangular plate with insulating properties. The surface F1 of the detectable portion 50 is disposed on a provision surface 122 of the corresponding key 12. The wiring pattern of the detectable portion 50 is formed by patterning conductive layers, such as copper foils, on the surfaces F1 and F2 of the substrate 551.

In FIG. 5, the keys 12 are arranged in the vertical direction, and the horizontal direction of one key 12 corresponds to the longitudinal direction. The width Bw of the detectable portion 50 disposed on the provision surface 122 of one key 12 is equal to or less than the width Kw of the key 12.

The surface F2 is a surface opposite to the surface F1 and opposes the signal generator 60. The first coil 51 of the detectable portion 50 includes a first portion 521 and a second portion 522. The first portion 521 and the second portion 522 are each a part of the wiring pattern on the surface F2 of the substrate 551. The first portion 521 is spiral shaped. The second portion 522 is formed substantially the same as the first portion 521. That is, the second portion 522 is spiral shaped in the same direction as the winding direction of the first portion 521. The spiral center of the first portion 521 is positioned at a via C1. The spiral center of the second portion 522 is positioned at a via C2. The vias C1 and C2 are connected each other by the wiring pattern 515 on the surface F1.

In this embodiment, the spiral of the first portion 521 is formed by a straight portion being bent at 90 degrees multiple times from the via C1, and the spiral extends outward. The outer shape of the first portion 521 is a rectangle. Similarly, the spiral of the second portion 522 is formed by a straight portion being bent at 90 degrees multiple times from the via C2, and the spiral extends outward. The outer shape of the second portion 522 is a rectangle. The entirety of the outer shape of the first and second portions 521 and 522 is a rectangle. In FIG. 5, two overall dimensions of the first and second portions 521 and 522 are shown, one of which is an overall dimension COL in the longitudinal direction (long axis direction) of the substrate 551, and the other of which is an overall dimension COW in the transverse direction (short axis direction) thereof. Further, an overall dimension CL (first distance) in the longitudinal direction of the substrate 551 is shown. The overall dimension COW corresponds to a dimension (size) (second distance) of the first coil 51 in the transverse direction of the substrate 551. The overall dimension COW of the first portion 521 and the overall dimension COW of the second portion 522 are each equal to or less than the dimension Bw (third distance) of the substrate 551 in the transverse direction. The first and second portions 521 and 522 are arranged in a row, the direction of which is the longitudinal direction of the substrate 551, that is, one that corresponds to the longitudinal direction of the key 12. The transverse direction of the substrate 551 is perpendicular to the arrangement of the first and second portions 521 and 522. That is, it is the width direction of the key 12.

The via C1 is positioned at the center of the first portion 521. The center is a point where the diagonals of the first portion 521, the outer shape of which is a rectangle, intersects. Similarly, the via C2 is positioned at the second portion 522. The center is a point where the diagonals of the second portion 522, the outer shape of which is a rectangle, intersects. Hereinafter, the distance between the center of the first portion 521 (via C1) and the center of the second portion 522 (via C2) is denoted by L1. The distance L1 is an example of a "first distance."

The first portion 521 has a first end that is as the via C1 and a second end. The second portion 522 has a first end that is as the via C2 and a second end. The capacitor 52 is mounted between the second end of the first portion 521 and the second end of the second portion 522. In the equivalence circuit of the detectable portion 50, the capacitor 52 is wired across the first coil 51, as shown in FIG. 3.

In this embodiment, the first and second portions 521 and 522 have the same dimensions and the same shape, and these are not limited thereto. Either the shape or the dimensions of the first portion 521 may differ from those of the second portion 522. When viewed in plan view, one or both of the first and second portions 521 and 522 may be a rectangle, in which the vertical direction in FIG. 5 corresponds to the longitudinal direction and the horizontal direction in FIG. 5 corresponds to the transverse direction. The planar shape of the first coil 51 is not limited to a shape that includes the first portion 521 and the second portion 522. That is, the first coil 51 may be formed by one spiral portion.

Figure 8:
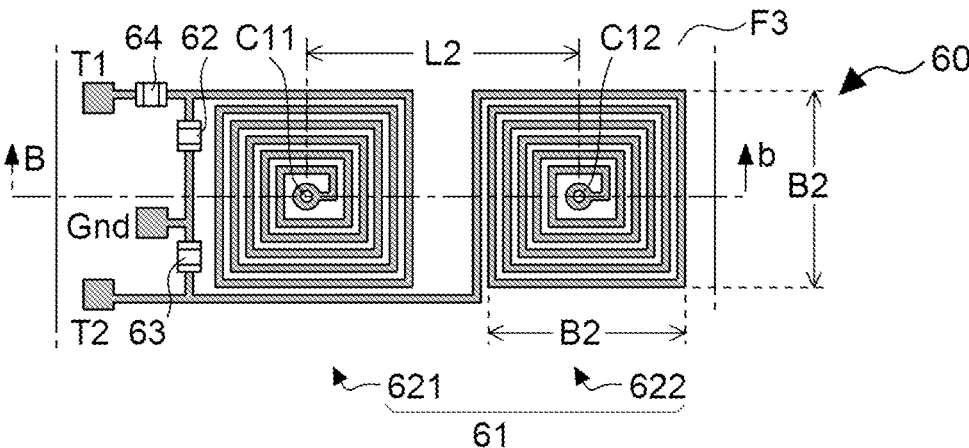
FIG. 8 is a plan view of a specific configuration of a signal generator.
Figure 9:
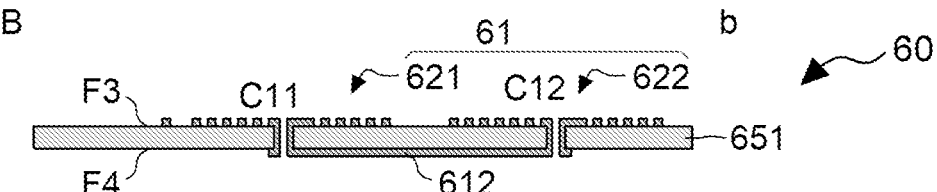
FIG. 9 is a cross-sectional view taken along line B-b shown in FIG. 8.

FIG. 8 is a plan view of the specific configuration of a signal generator 60, which is viewed from the corresponding detectable portion 50. FIG. 9 is a cross-sectional view taken along line B-b shown in FIG. 8.

The signal generator 60 includes a substrate 651 and a wiring pattern provided on both surfaces F3 and F4 of the substrate 651. The substrate 651 is a plate with insulating properties. The surface F4 of the signal generator 60 opposes the supporting member 14. The surface F3 is a surface opposite to the surface F4 and opposes the detectable portion 50. The wiring pattern is formed by patterning conductive layers, such as copper foils, on the surfaces F3 and F4 of the substrate 651.

In FIG. 8, the keys 12 (not shown in FIG. 8) are arranged in the vertical direction. The horizontal direction in FIG. 8 corresponds to the longitudinal direction of one key 12. The longitudinal direction of the key 12 is directed from the front end (closer to the player) of the key 12 to the root thereof.

The second coil 61 of the signal generator 60 includes a third portion 621 and a fourth portion 622. The third and fourth portions 621 and 622 are each a part of the wiring pattern formed on the surface F3. The third portion 621 is substantially square and spiral shaped. The fourth portion 622 is formed substantially the same as the third portion 621. That is, the fourth portion 622 is spiral shaped in the same direction as the winding direction of the third portion 621. The spiral center of the third portion 621 is positioned at a via C11. The spiral center of the third portion 622 is positioned at a via C12. The vias C11 and C12 are connected each other by the wiring pattern 612 on the surface F4.

In this embodiment, the third and fourth portions 621 and 622 have the same dimensions and the same shapes, but this embodiment are not limited thereto. The dimensions of the third portion 621 may differ from those of the fourth portion 622. The shape of the third portion 621 may differ from that of the fourth portion 622. The planar shape of the second coil 61 is not limited to a shape that includes the third and fourth portions 621 and 622. That is, the second coil 61 may be formed by one spiral portion.

In this embodiment, the outer shape of the third portion 621 is substantially square. Similarly, the outer shape of the fourth portion 622 is a substantially square. The outer shape of each of the third and fourth portions 621 and 622 is a square having one side parallel to the longitudinal direction of the key 12. The direction orthogonal to the side corresponds to the width direction of the key 12. The dimension of one side (overall dimension) of the square is B2.

The via C11 is positioned at the center of the third portion 621, and the via C12 is positioned at the center of the fourth portion 622. This center is intended to be the center of the coil when viewed in plan view. When the coil is a square or a rectangle, the diagonals intersect at the center. When it is circular, the center is intended to be the center of the outer circle. In addition, the distance between the center of the third portion 621 (via C11 in this embodiment) and the center of the fourth portion 622 (via C12 in this embodiment) is denoted by L2. The distance L2 is an example of the second distance.

A part of the wiring pattern on the surface F3 except for the second coil 61 is used to be wired to the capacitance elements 62 and 63, the resistor 64, the input T1 and the output T2.

As mentioned above, the input T1 receives a reference signal R from the supply circuit 22. From the output T2, a detection signal d with a voltage level δ depending on the distance dr between the first coil 51 and the second coil 61. In the above configuration of the detectable portion 50 and the signal generator 60, the first and third portions 521 and 621 oppose each other, and the second and fourth portions 522 and 622 oppose each other. An example of the dimensional relationship is given by COW=B2×70%, and COL=B2.

Figure 7:
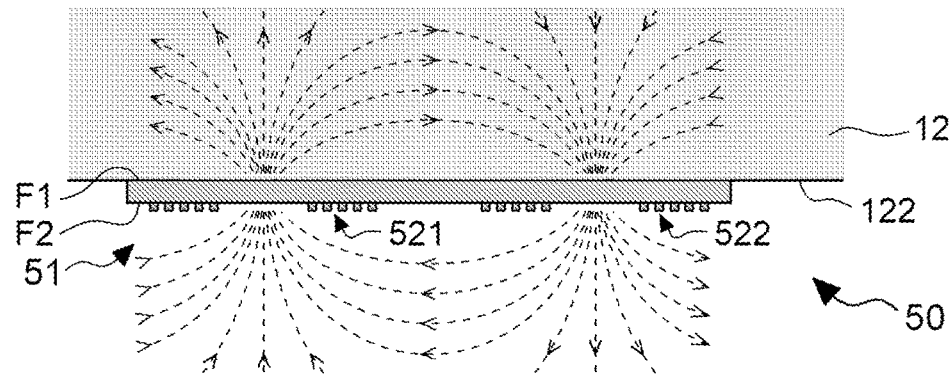
FIG. 7 illustrates magnetic fields generated by a first coil of a detectable portion.
Figure 10:
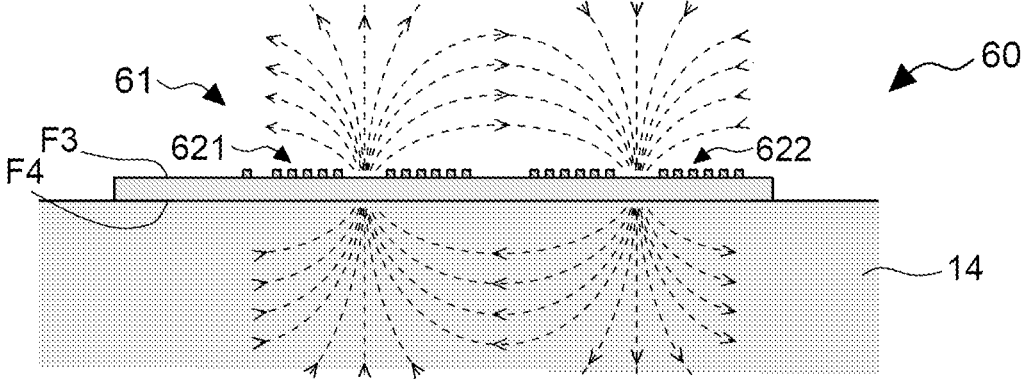
FIG. 10 illustrates a magnetic field generated by a second coil of the signal generator.

Next, description will be given of operation of a detectable portion 50 and a signal generator 60. FIG. 7 shows an example of a direction of a magnetic field generated by the detectable portion 50. FIG. 10 shows an example of a direction of a magnetic field generated by the signal generator 60. When a supply of a reference signal R to the signal generator 60 causes a counterclockwise current to flow in the third portion 621 starting from the via C11 shown in FIG. 8, a clockwise current flows in the fourth portion 622 toward the via C12. As a result, a magnetic field is generated in the third portion 621, the direction of which is coining out of the plane of the paper in FIG. 8 and is toward the upper side of the paper in FIG. 10. Furthermore, a magnetic field is generated in the fourth portion 622, the direction of which is going into the plane of the paper in FIG. 8 and is toward the lower side of the paper in FIG. 10.

In other words, as shown in FIG. 10, magnetic fields are generated in opposite directions in the third and fourth portions 621 and 622. As mentioned above, the keys 12 are arranged in the keyboard 10, the direction of which is perpendicular to the plane of the paper in FIG. 10. As a result, magnetic fields in opposite directions are generated at the third and fourth portions 621 and 622. This reduces expansion of a magnetic field that is generated in the signal generator 60 that is opposite two adjacent keys 12. As a result of the reduced magnetic field expansion, a detection signal D with high accuracy is generated based on a position Z of each of the keys 12.

In FIG. 10, an example is given in which a counterclockwise current flows in the third portion 621 in FIG. 8, and a clockwise current flows in the fourth portion 622. Similarly to the above example, the direction of the magnetic field will be in the opposite direction when a clockwise current flows in the third portion 621 and a counterclockwise current flows in the fourth portion 622.

The third and fourth portions 621 and 622 of the second coil 61 included in the signal generator 60 are formed by patterning conductive layers on the surface F4. This provides an advantage in that the second coil 61 is easier to manufacture and deal with, as compared to the second coil 61 that is formed by winding conducting wires.

When the first coil 51 moves away from the second coil 61 while the signal generator 60 receives a reference signal R, a magnetic field is generated in the first coil 51 in a direction that reduces a magnetic field generated by the second coil 61 (i.e., a magnetic field in the same direction as the magnetic field generated by the second coil 61). As a result, in this case, a current is induced in the first coil 51 in response to a magnetic field in the same direction as that generated by the second coil 61.

For example, when the first coil 51 of the detectable portion 50 moves away from the second coil 61 while a magnetic field in the direction, as shown in FIG. 10, generated by the second coil 61 of the signal generator 60, a magnetic field is generated in the first coil 51 in the same direction as that generated by the second coil 61. Thus, in FIG. 5, a clockwise current flows in the first portion 521 of the first coil 51 and a counterclockwise current flows in the second portion 522.

Alternatively, when the first coil 51 of the detectable part 50 approaches the second coil 61 while a magnetic field is generated by the second coil 61 of the signal generator 60 in the direction shown in FIG. 10, a magnetic field is generated in the first coil 51 in the direction opposite to the magnetic field generated by the second coil 61. Thus, in FIG. 5, a counterclockwise current flows in the first portion 521 of the first coil 51, and a clockwise current flows in the second portion 522.

When the first coil 51 approaches the second coil 61 while a magnetic field is generated in the second coil 61 in the direction opposite to the direction shown in FIG. 10, a magnetic field in the opposite direction of the magnetic field generated by the second coil 61, that is, the magnetic field shown in FIG. 7, is generated in the first coil 51.

Alternatively, when the first coil 51 approaches the second coil 61 while a magnetic field is generated in the second coil 61 in the direction shown in FIG. 10, a clockwise current flows in the first portion 521 of the first coil 51, and a counterclockwise current flows in the second portion 522. When the first coil 51 moves away from the second coil 61 while a magnetic field is generated in the second coil 61 in the direction opposite to the magnetic field shown in FIG. 10, a clockwise current flows in the first portion 521 of the first coil 51, and a counterclockwise current flows in the second portion 522.

Description will be given of a configuration of and processing of the detection system 15 that improves linearity relating to output characteristics of the detection signal, that is, makes a detection distance longer. The output characteristics represent a relationship between (i) a distance dr between the first coil 51 and the second coil 61, and (ii) a voltage level δ of a detection signal d. The linearity of the output characteristics means that the voltage level δ is roughly proportional to the distance dr. The detection distance means a range of the distance dr over which the voltage level δ significantly changes in response to change in the distance dr. That is, the detection distance means the range of the distance dr based on the voltage level δ.

In order to improve the linearity of the output characteristics, in this embodiment, a distance (first distance) L1 between the center of the first portion 521 and the center of the second portion 522 is greater than a distance (second distance) L2 between the center of the third portion 621 and the center of the fourth portion 622.

Figure 11:
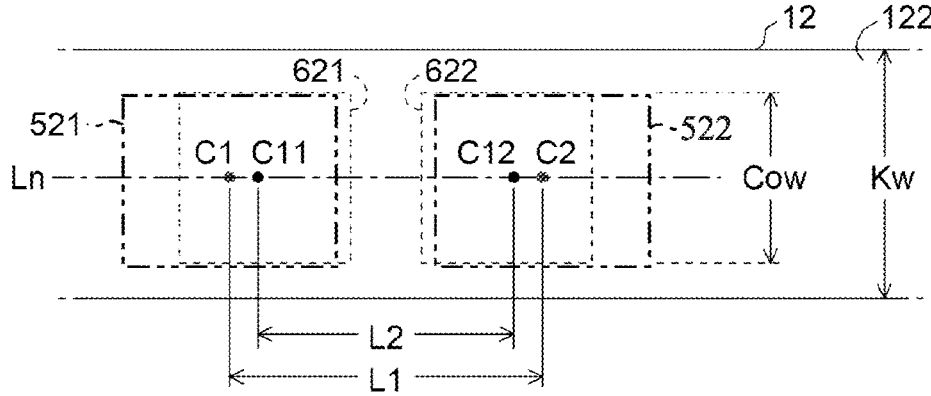
FIG. 11 illustrates a positional relationship between the first and second coils.

FIG. 11 is a plan view of a positional relationship between a first coil 51 and a second coil 61. In FIG. 11, a detectable portion 50 is disposed on the provision surface 122 of a key 12, and a signal generator 60 is disposed on the supporting member 14. Specifically, in the plan view of FIG. 11, (i) the first and second portions 521 and 522 of the first coil 51, and (ii) the third and fourth portions 621 and 622 of the second coil 61 are viewed from the detectable portion 50 to the signal generator 60.

The vias C1 and C2, and the vias C11 and C12 are positioned on a straight line Ln in the longitudinal direction of the key 12. The vias C11 and C12 are positioned between the vias C1 and C2.

In each displacement sensor 20 according to this embodiment, the distance L1 between the center of the first portion 521 and the center of the second portion 522 included in the detectable portion 50 is greater than the distance L2 between the center of the third portion 621 and the center of the fourth portion 622 included in the signal generator 60. Now description will be given of effectivity of the distance L1 exceeding the distance L2.

Two Configurations A and B will now be given in which the distances L1 and L2 are changed, and output characteristics obtained thereby will be compared to each other.

Figure 12:
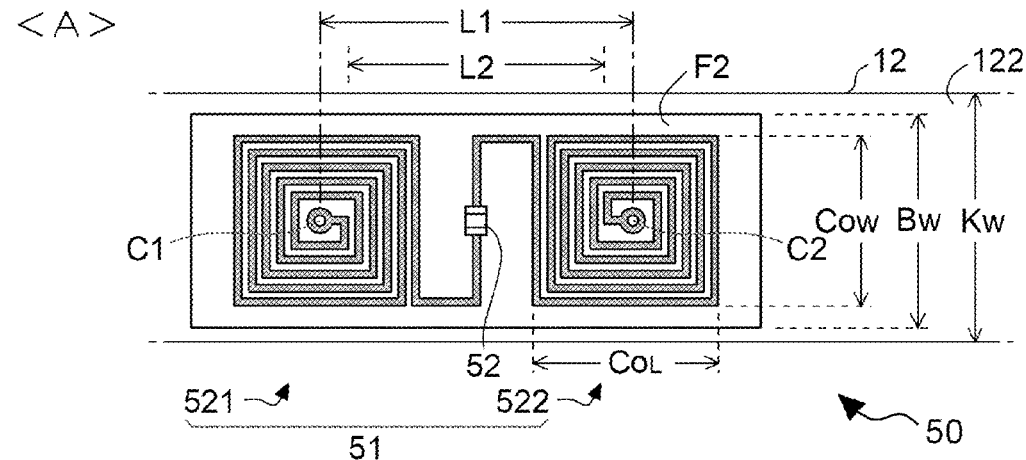
FIG. 12 is a plan view of a detectable portion according to a comparative example.
Figure 13:
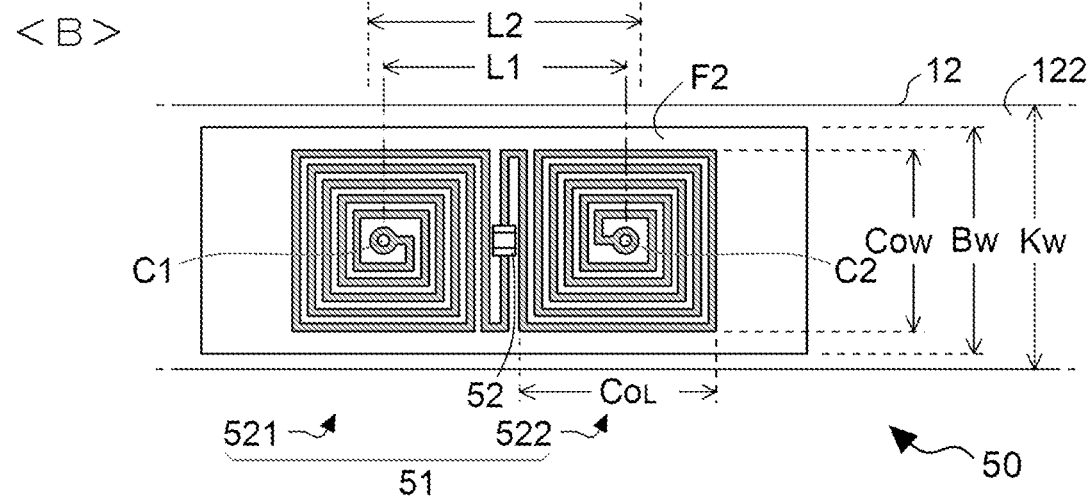
FIG. 13 is a plan view of a detectable portion according to a comparative example.

In Configuration A shown in FIG. 12, the distance L1 in the first coil 51 is greater than the distance L2. In Configuration B shown in FIG. 13, the distance L1 in the first coil 51 is less than the distance L2. Specifically, the distance L1 as shown in FIG. 12 is a distance obtained by multiplying L2 shown in FIG. 8 by 120% (L2×120%). The distance L1 shown in FIG. 13 is a distance obtained by multiplying L2 by 80% (L2×80%). The overall dimensions COL and COW shown in FIG. 12 and those shown in FIG. 13 each have a length obtained by multiplying the overall dimension B2 shown in FIG. 8 by 70% (B2×70%). In this comparison, the configuration shown in FIG. 8 is applied to the signal generator 60.

Figure 14:
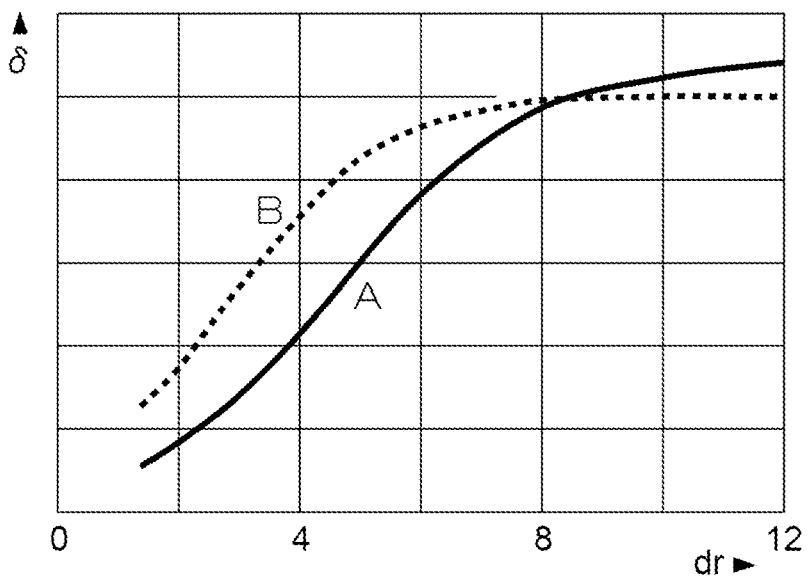
FIG. 14 shows an example of output characteristics of a detection signal.

FIG. 14 shows output characteristics of displacement sensors 20 in Configurations A and B. In FIG. 14, the vertical axis shows a voltage level δ [V] of a detection signal d. The horizontal axis shows a distance depending on the position of a displacement Z, specifically, a distance dr between the first coil 51 and the second coil 61. In FIG. 14, the solid line shows the output characteristics obtained by Configuration A of FIG. 12. The dashed line shows the output characteristics obtained by Configuration B of FIG. 13.

In Configuration A, the output voltage increases even when the distance dr exceeds 10 mm. In contrast, in Configuration B, the output voltage remains unchanged (is almost constant) when the distance dr exceeds 8 mm.

Comparing the output characteristics of Configurations A and B, it is found that Configuration A shown by the solid line has a wider range of the distance dr over which the output of the detection signal d changes than Configuration B shown by the dashed line. That is, Configuration A has a wider range that is detectable by the displacement sensor 20. Configuration A shown with the solid line has higher linearity of the output characteristics than Configuration B shown by the dashed line.

In this embodiment, an additional approach to improve the linearity of the output characteristics is that the outer shape of the first and second portions 521 and 522 of the detectable portion 50 are a rectangle extending in the longitudinal direction of a key 12, not a square as shown in FIG. 12.

It is preferable that the area of the first and second portions 521 and 522 that act as coils be larger. For this reason, in this embodiment, the outer shape of each of the first and second portions 521 and 522 of the detectable portion 50 is a rectangle in the longitudinal direction of the key 12. Specifically, in this embodiment, the first and second portions 521 and 522 each have overall dimensions COL that are greater than the overall dimensions COW. In this embodiment, the first and second portions 521 and 522 each have a dimensional ratio of the overall dimension COW to the overall dimension COL of 7:10.

Figure 15:
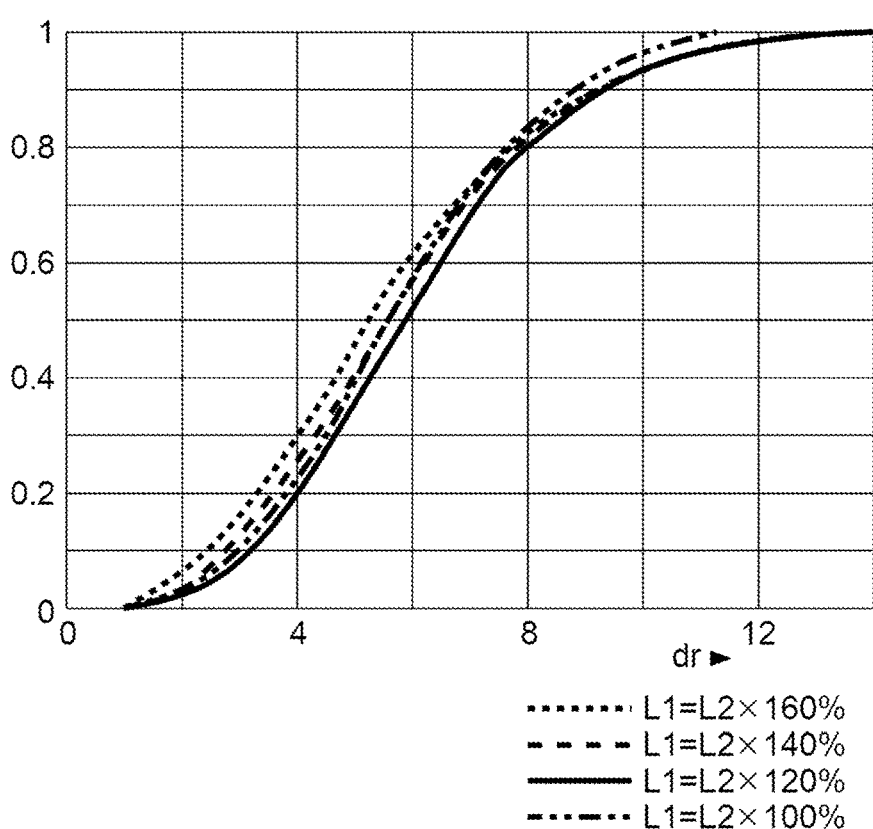
FIG. 15 shows an example of output characteristics of a detection signal.

Next, the relationship between distance L1 and distance L2 will be discussed. FIG. 15 shows output characteristics obtained by changing a ratio (%) of the distance L1 with respect to the distance L2 to 100%, 120%, 140% and 160%. The voltage level δ on the vertical axis is normalized so that the minimum is "0" and the maximum is "1" for comparison. The configuration shown in FIG. 8 is applied to the signal generator 60 in this discussion.

This figure shows four kinds of output characteristics. Among these, the highest linearity index (e.g., R-squared value) is obtained when the distance L1 is L2×120%. The lowest linearity index is obtained when the distance L1 is L2×160%. For this reason, in terms of ensuring linearity, it is preferable that the distance L1 be within the range of about 120% based on the distance L2 as a standard. Specifically, the distance L1 with respect to the distance L2 is set to be greater than 100% and be 140% or less (L2<L1≤1.4×L2).

When the distance L1 with respect to the distance L2 is set to be within the above-mentioned range, a magnetic field generated by the second coil 61 is reduced, and it spreads to the first coil 51. As a result, the linearity of the output characteristics of the detection signal d is enhanced. Furthermore, under this setting, even when the position of the first coil 51 slightly differs from that of the second coil 61, the linearity of the output characteristics is not impaired compared to a case in which the first coil 51 is set to be out of the range.

Approach 1: Improving Linearity of Output Characteristics

Figure 16:
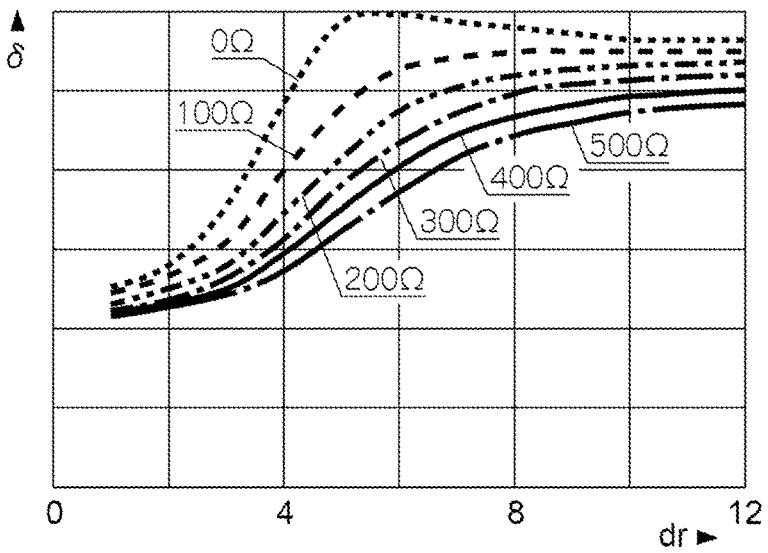
FIG. 16 shows an example of output characteristics of a detection signal.

In addition to the foregoing embodiment, the first approach to improve the linearity of output characteristics is to apply the resistor 64 as a damping resistor to the resonance circuit of the signal generator 60 to lower the Q value (Quality Factor) of the resonance circuit. FIG. 16 shows output characteristics obtained by changing step by step the resistance of the resistor 64 included in the circuit shown in FIG. 3. In FIG. 16, six patterns of changes of the output characteristics are shown, and these are obtained by changing the resistance of the resistor 64 to 0, 100, 200, 300, 400 and 500Ω.

In FIG. 16, when there is no resistor 64 (0Ω), that is, the Q value is highest, the voltage level δ of the detection signal d reaches the maximum when the distance dr is slightly over 5 mm Thereafter, the voltage level δ decreases with increasing distance dr. Accordingly, only a narrow detection range of 1 to 5 mm can be available for the detection range. However, when the resistor 64 with 100Ω is used to reduce the Q value, even in the range of the distance dr being greater than 5 mm, the voltage level δ of the detection signal d increases slightly with increasing distance dr. Then, as the resistance of the resistor 64 increases, the range of change in voltage level δ decreases in each of the following ranges: (i) small range (e.g., 1 to 3 mm) in which the distance dr is small, (ii) large range (e.g., 8 to 10 mm), and (iii) middle range (e.g., 4 to 6 mm).

Thus, as the resistance of the resistor 64 of the signal generator 60 increases, the Q value decreases, and the linearity of the output characteristics increase. That is, the detection distance can be increased.

It is noted that no resistor as a damping resistor is disposed on the detectable portion 50. This is because sufficient detection characteristics can be obtained without reducing the Q value. However, a resistor as a damping resistor may be disposed on the detectable portion 50 for stability of detection and for manufacture of devices.

Approach 2: Improving Linearity of Output Characteristics

An additional approach to improve the linearity of the output characteristics is to lower the frequency of a reference signal R to be supplied to the input T1 below at most 2% lower than the resonance frequency of the corresponding detectable portion 50 (i.e., ranging from 98% to 100% of the resonance frequency). It is preferable that the frequency of the reference signal R be lower than the resonance frequency of the detectable portion 50 by about 1%.

Figure 17:
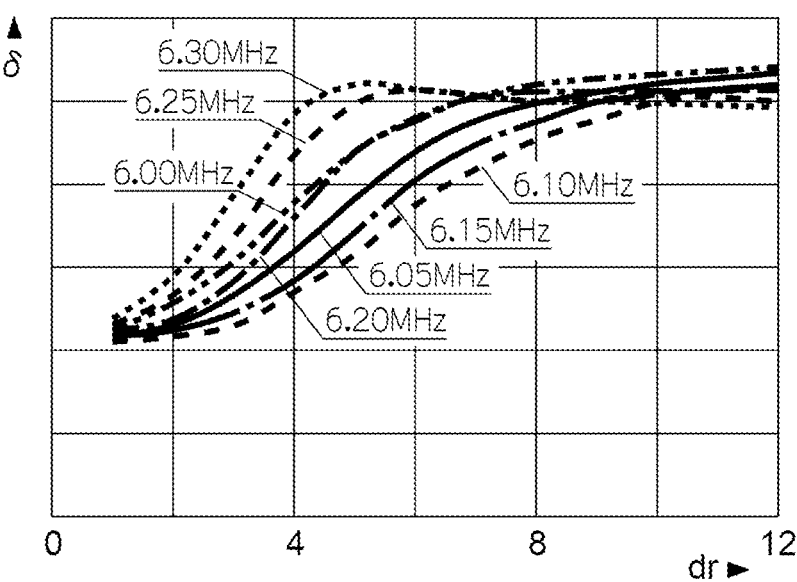
FIG. 17 shows an example of output characteristics of a detection signal.

FIG. 17 shows output characteristics obtained by changing the frequency of a reference signal R step by step when the resonance frequency of a detectable portion 50 is at 6.15 MHz, the reactance of the first coil 51 is at 3.04 μH, and the capacitance of the capacitor 52 is at 220 pF in this embodiment. In FIG. 17, seven patterns of changes of the output characteristics are shown, and these are obtained by changing the frequency of the reference signal R to 6.00, 6.05, 6.1, 6.15, 6.20, 6.25 and 6.30 MHz.

In FIG. 17, when the frequency of the reference signal R is higher than 6.15 MHz (i.e., 6.20, 6.25 and 6.30 MHz), the slope of an output signal level increases in a small range (e.g., 1 to 3 mm) in which the distance dr is small, and in middle range (e.g., 4 to 6 mm), compared to a case in which a reference signal R with the same frequency as the resonant frequency of the detectable portion 50 is used. Such an output characteristic is not maintained in the range greater than 7 mm. Furthermore, when the frequency of the reference signal R is at 6.25 Hz or 6.30 MHz, the voltage level δ decreases in the range of 6 mm or more, and but the distance dr increases in this range. This frequency is not suitable for detection.

In contrast, when the frequency of the reference signal R is at most 2% lower than 6.15 MHz, the linearity suitable for detection can be obtained. When the frequency of the reference signal R is set to 6.10 MHz, which is about 1% lower than the resonance frequency of the detectable portion 50, the linearity of the output characteristics will be higher.

In either Approach 1 (lowering the Q-value of the resonant circuit of the signal generator 60) or Approach 2 (lowering the frequency of the reference signal R below the resonant frequency of the detectable portion 50), there is an optimal solution that maximizes the linearity. This optimal solution can be obtained by numerical analysis using a computer.

In this embodiment, the outer shape of each of the first to fourth portions 521, 522, 621 and 622 is a rectangle including a square. However, it may be other quadrilaterals, such as a rhombus, or it may be a circle, such as a perfect circle or an ellipse. In such a case, the center corresponds to the intersection of the diagonals for a rectangle, it corresponds to the center for a complete circle, and it corresponds to the intersection of the major and minor axes for an ellipse.

B: Modifications

Specific modifications added to each of the aspects described above are described below. Two or more modes selected from the following descriptions may be combined with one another as appropriate as long as such combination does not cause any conflict.

(1) The foregoing embodiment describes a configuration for detecting the displacement of the key 12 in the musical keyboard instrument 100. However, a movable member, of which the displacement is detected by the displacement sensor 20, is not limited to the key 12. The structure of a musical keyboard is not limited to this example. Some specific modes of the movable member are described below.

Mode 1

Figure 18:
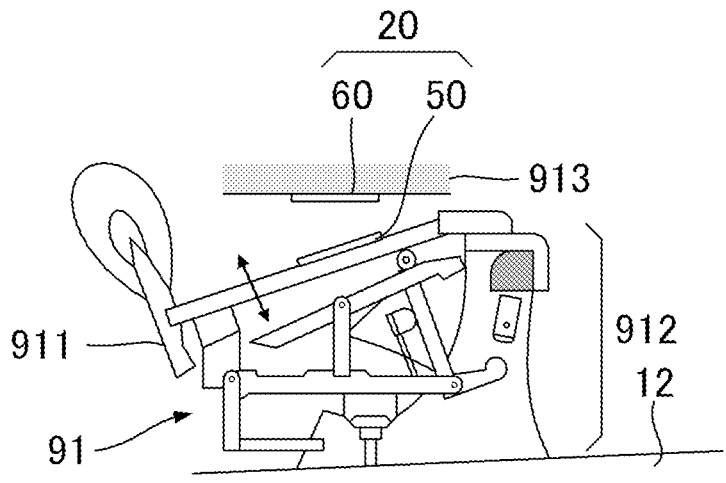
FIG. 18 shows a displacement sensor according to a modification.

FIG. 18 is a schematic diagram of a configuration in which the displacement sensor 20 is applied to a strike mechanism 91 of the musical keyboard instrument 100. The strike mechanism 91 is a mechanism that strikes a string (not shown) in conjunction with a displacement of each key 12 in the keyboard 10. Specifically, the strike mechanism 91 includes, for each key 12, a hammer 911 capable of striking a string by rotation and a transmission mechanism 912 (e.g., a whippen, jack, repetition lever, etc.) that causes the hammer 911 to rotate in conjunction with the displacement of the key 12. The detectable portion 50 is disposed on the hammer 911 (e.g., at a hammer shank). The signal generator 60 is disposed on the supporting member 913. In this configuration, the displacement sensor 20 detects the displacement of the hammer 911. Specifically, the supporting member 913 is a structure that supports the strike mechanism 91. The detectable portion 50 may be disposed on a member of the strike mechanism 91 other than the hammer 911.

Mode 2

Figure 19:
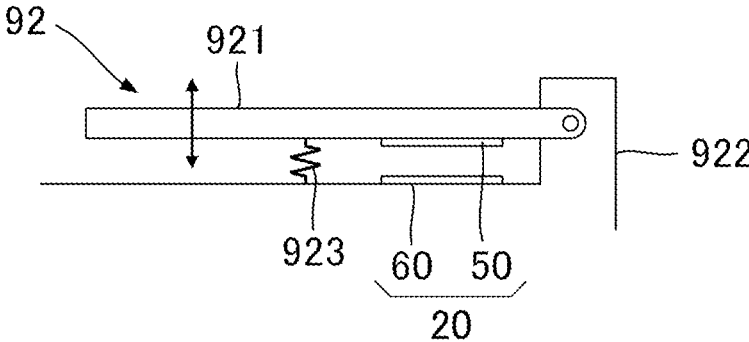
FIG. 19 shows a displacement sensor according to a modification.

FIG. 19 is a schematic diagram of a configuration in which the displacement sensor 20 is applied to a pedal mechanism 92 of the musical keyboard instrument 100. The pedal mechanism 92 includes a pedal 921 operated by a user's foot, a supporting member 922 that supports the pedal 921, and an elastic body 923 that urges the pedal 921 in the upward vertical direction. The detectable portion 50 is disposed on the bottom of the pedal 921. The signal generator 60 is disposed on the supporting member 922 so as to face the detectable portion 50. In this configuration, the displacement sensor 20 detects the displacement of the pedal 921. A musical instrument for which the pedal mechanism 92 is used is not limited to the musical keyboard instrument 100. For example, the pedal mechanism 92 of the same configuration may be used in a freely selected musical instrument, such as a percussion instrument, etc.

As will be understood from the above examples, an object of detection by the displacement sensor is a movable member that is displaced in response to a playing operation. The movable member includes an instrument operating element, such as the keys 12 or the pedal 921, directly operated by a user and also includes a structure such as the hammer 911 that is displaced in conjunction with an operation performed on an instrument playing element. However, the movable member according to the present disclosure is not limited to a member that is displaced in response to a playing operation. That is, the movable member should be understood as a displaceable member regardless of how displacement takes place.

(2) In the foregoing embodiment, there is shown a configuration in which the musical keyboard instrument 100 includes the sound source circuit 34. However, the sound source circuit 34 may be omitted in a configuration in which the musical keyboard instrument 100 has a sound producing mechanism such as strike mechanism 91, for example. The detection system 15 is used to record how the musical keyboard instrument 100 is played. The sound producing mechanism and the sound source circuit 34 are a sound generator that generates sound in accordance with the results of the detection by the detection system 15.

As will be understood from the above description, the present disclosure may be considered to be an apparatus (instrument playing apparatus) that controls a musical sound by outputting to the sound source circuit 34 or the sound producing mechanism an operation signal in accordance with a playing operation. The concept of the instrument playing apparatus includes not only an instrument (the musical keyboard instrument 100) provided with the sound source circuit 34 or the sound producing mechanism as described in the foregoing embodiment, but also a device that is not provided with the sound source circuit 34 or a sound producing mechanism (e.g., a MIDI controller or the pedal mechanism 92 as described above). That is, the instrument playing apparatus according to the present disclosure is explained as an apparatus operated by an instrument player (or an operator) for playing an instrument.

(3) Any one of the foregoing approaches to improve linearity of output characteristics may be implemented, or two or more approaches may be used together as appropriate.

C: Appendices

The following configurations are derivable from the embodiments described above.

A displacement sensor according to one aspect (Aspect 1) of the present disclosure includes: a detectable portion: including a first coil; and being disposed on a movable member that is displaceable in response to an operation; and a signal generator: including a second coil that opposes the first coil; and being configured to generate a detection signal based on a relative position between the first coil and the second coil, in which a first distance from a first end of the first coil to a second end of the first coil in a first direction differs from a second distance from a third end of the first coil to a fourth end of the first coil in a second direction perpendicular to the first direction when the first coil is viewed in plan view.

According to this aspect, linearity is improved when the detection signal changes based on a change in the relative position between the first coil of the detectable portion and the second coil that opposes the first coil. As a result, a detection signal with high accuracy based on the displacement of the movable member can be generated. This allows for longer distance measurement.

The "overall dimension" of a coil in a particular direction means a dimension (size) in this direction and relates to an outline showing the outer shape of the coil. The "overall dimension" refers to the maximum dimension of the coil in the direction.

In an example (Aspect 2) according to Aspect 1, the detectable portion further includes a rectangular substrate on which the first coil is formed, the first direction corresponds to a longitudinal direction of the substrate, the second direction corresponds to a transverse direction of the substrate, and the second distance from the third end of the first coil to the fourth end of the first coil in the second direction is equal to or less than a third distance from a fifth end of the substrate to a sixth end of the substrate in the transverse direction.

In another aspect of the present disclosure (Aspect 3), the first distance from the first end of the first coil to the second end of the first coil in the first direction is greater than the second distance from the third end of the first coil to the fourth end of the first coil in the second direction.

A displacement sensor according to another aspect (Aspect 4) of the present disclosure includes: a detectable portion: including a first coil; and being disposed on a movable member that is displaceable in response to an operation; and a signal generator: including a second coil that opposes the first coil; and being configured to generate a detection signal based on a relative position between the first coil and the second coil, in which: the first coil includes a first part and a second part that generate opposite magnetic fields from each other in response to a current being received by the first coil, the second coil includes a third part and a fourth part that generate opposite magnetic fields from each other in response to a current being received by the second coil, and a first distance between a center of the first part and a center of the second part is greater than a second distance between a center of the third part and a center of the fourth part.

According to this aspect, linearity is improved when the detection signal changes based on a change in the relative position between the first coil of the detectable portion and the second coil that opposes the first coil. As a result, a detection signal with high accuracy based on the displacement of the movable member can be generated. In addition, leakage of a magnetic field generated by the second coil is reduced, thereby improving accuracy of the detection.

In an example (Aspect 5) according to Aspect 4, $L2 < L1 \leq 1.4 \times L2$, where $L1$ is the first distance between the center of the first part and the center of the second part, and L2 is the second distance between the center of the third part and the center of the fourth part.

An electronic musical instrument according to an aspect (Aspect 6) of the present disclosure includes: a displacement sensor including: a detectable portion: including a first coil; and being configured to disposed on a movable member that is displaceable in response to an operation; and a signal generator: including a second coil that opposes the first coil; and being configured to generate a detection signal based on a relative position between the first coil and the second coil; and a sound controller configured to generate an audio signal representative of a sound based on a level of the detection signal, in which a first distance from a first end of the first coil to a second end of the first coil in a first direction differs from a second distance from a third end of the first coil to a fourth end of the first coil in a second direction perpendicular to the first direction when the first coil is viewed in plan view.

A displacement sensor according to another aspect (Aspect 7) of the present disclosure includes: a detectable portion: being disposed on a movable member that is displaceable in response to an operation; and including a substrate on which a first coil is formed; and a signal generator: including a second coil; and being configured to generate a detection signal based on a relative position between (i) the first coil of the detectable portion and (ii) the second coil that opposes the second coil, in which: the detectable portion and the signal generator form a resonance circuit, the signal generator includes a resistor that lowers a Q value, and the detectable portion does not include a resistor that lowers the Q value.

A displacement sensor according to another aspect (Aspect 8) of the present disclosure includes: a detectable portion: being disposed on a movable member that is displaceable in response to an operation; and including a substrate on which a first coil is formed; and a signal generator: including a second coil; and being configured to generate a detection signal based on a relative position between (i) the first coil of the detectable portion and (ii) the second coil that opposes the second coil, in which: a frequency of the detection signal generated by the signal generator is at most 2% lower than a resonance frequency of the detectable portion (i.e., ranging from 98% to 100% of the resonance frequency).

DESCRIPTION OF REFERENCE SIGNS

100 . . . musical keyboard instrument (electronic musical instrument), 10 . . . keyboard, 12 . . . key, 15 . . . detection system, 20 . . . displacement sensor, 21 . . . signal processing circuit, 22 . . . supply circuit, 23 . . . output circuit, 30 . . . information processing apparatus, 31 . . . controller, 32 . . . storage device, 33 . . . A/D converter, 34 . . . sound source circuit, 40 . . . sound output device, 50 . . . detectable portion, 51 . . . first coil, 52 . . . capacitor, 521 . . . first portion 522 . . . second portion, 551 . . . substrate, 523 . . . third portion, 524 . . . fourth portion, 551, 552 and 553 . . . substrate, 60 . . . signal generator, 61 . . . second coil 612 . . . wiring pattern, 621 . . . third portion, 622 . . . fourth portion, 651 . . . substrate, 62 . . . capacitor, 63 . . . capacitor, 64 . . . resistor, 911 . . . hammer, 912 . . . transmission mechanism, 913 . . . supporting member, 921 . . . pedal, 922 . . . supporting member, 923 . . . elastic body.

What is claimed is:

1. A displacement sensor comprising:
   a detectable portion:
   including a first coil; and
   being disposed on a movable member that is displaceable in response to an operation; and
   a signal generator:
   including a second coil that opposes the first coil; and
   being configured to generate a detection signal based on a relative position between the first coil and the second coil, wherein:
   the first coil includes a first part and a second part that generate opposite magnetic fields from each other in response to a current being received by the first coil,
   the second coil includes a third part and a fourth part that generate opposite magnetic fields from each other in response to a current being received by the second coil, and
   a first distance between a center of the first part and a center of the second part is greater than a second distance between a center of the third part and a center of the fourth part.

2. The displacement sensor according to claim 1, wherein L2<L1≤1.4×L2, where L1 is the first distance between the center of the first part and the center of the second part, and L2 is the second distance between the center of the third part and the center of the fourth part.

\* \* \* \* \*